C. S. LOCKWOOD.
FASTENER FOR ROTARY ELEMENTS.
APPLICATION FILED JAN. 13, 1913.
1,088,287.
Patented Feb. 24, 1914.
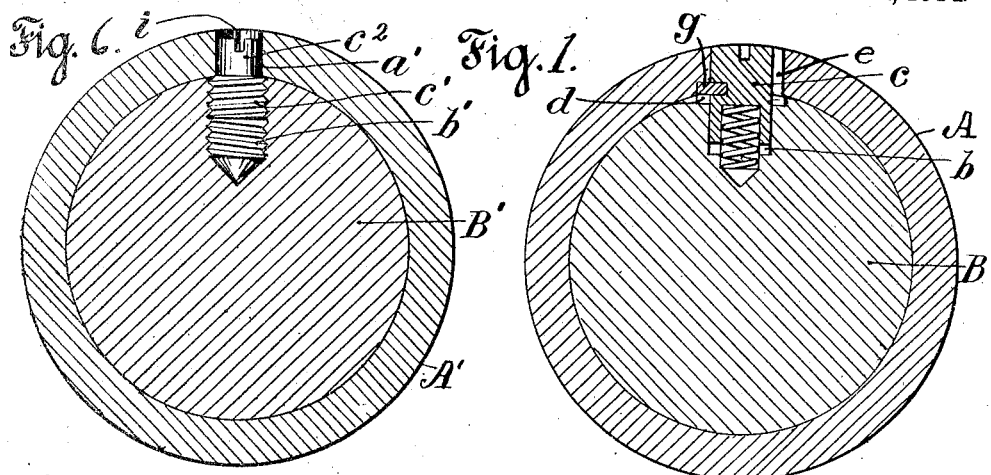
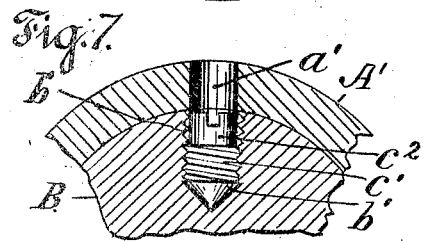
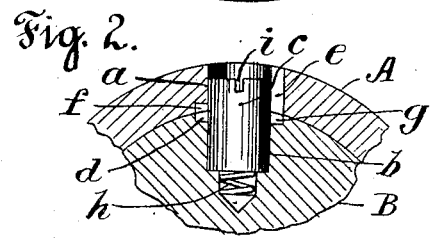
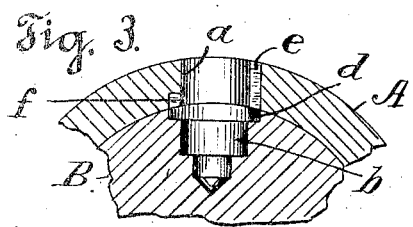
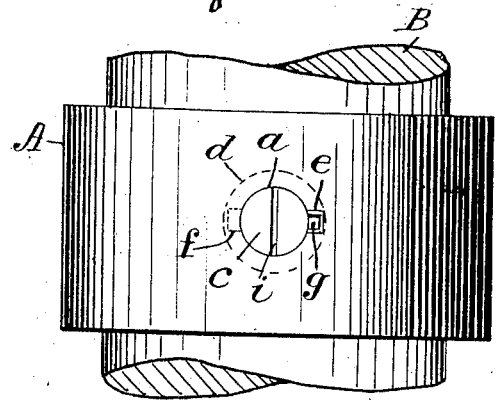
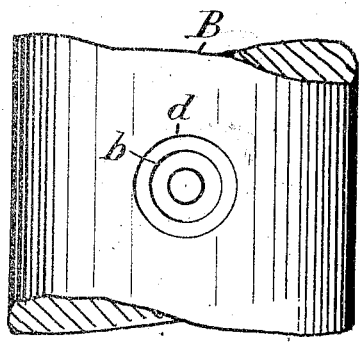

UNITED STATES PATENT OFFICE.

CHARLES S. LOCKWOOD, OF NEWARK, NEW JERSEY, ASSIGNOR TO HYATT ROLLER BEARING COMPANY, OF HARRISON, NEW JERSEY, A CORPORATION OF NEW JERSEY.

FASTENER FOR ROTARY ELEMENTS.

1,088,287.  Specification of Letters Patent.  Patented Feb. 24, 1914.

Application filed January 13, 1913. Serial No. 741,621.

*To all whom it may concern:*

Be it known that I, CHARLES S. LOCKWOOD, a citizen of the United States, residing at 289 Market street, Newark, county of Essex, and State of New Jersey, have invented certain new and useful Improvements in Fasteners for Rotary Elements, fully described and represented in the following specification and the accompanying drawings, forming a part of the same.

This invention relates to a means of securing a sleeve, collar, hub or similar part detachably upon a shaft or other carrying member without forming any projection upon the sleeve or collar, and without depending upon screw pressure to produce a firm engagement of the parts. Keys and set-screws have been employed for securing such parts together all depending for their efficiency upon pressure and frictional engagement, and both are liable to accidental detachment or loosening, and are often constructed so as to form a projection upon the shaft or hub, which sometimes causes damage by accidental contact or engagement with adjacent parts.

In the present invention, a fastener like a plug is extended into engagement with coincident bores or holes formed radially through the sleeve and in the surface of the shaft, and the engagement of such plug locks the parts together in the required manner, and without any projection from the surface of the sleeve. The plug is fitted movably in the said bores so that it may move longitudinally, and may thus be wholly removed from the bores, or may be moved inwardly to the surface of the shaft, so as not to interfere with the removal of the sleeve. The bore is extended entirely through the sleeve so that the outer end of the plug is readily accessible, and such outer end is provided with means for rotating it and moving it inwardly in the act of disengaging the sleeve from the shaft. Plugs adapted respectively for disengagement by these two movements are shown in the annexed drawing, in which—

Figure 1 is a cross section of a shaft with a collar and the fastener in section; Fig. 2 is a section of part of the shaft and sleeve with the plug adjusted in position for removal from the bore; Fig. 3 is a similar section with the plug removed; Fig. 4 is a side view of the sleeve and shaft with the plug in the position shown in Fig. 2; Fig. 5 is a side view of the shaft showing the bore and recess therein; Fig. 6 is a cross section of a shaft with the plug threaded to a bore in the shaft and shown in engagement with the sleeve; and Fig. 7 is a similar section of part of the shaft and sleeve with the plug disengaged from the sleeve.

In Figs. 1 to 5, the bore $a$ in the sleeve A and the bore $b$ in the shaft B are cylindrical and of the same size, to receive a cylindrical fastener $c$ of plug-shape which is movable freely in the said bores. The mouth of the bore $b$ is surrounded by an annular recess $d$, upon the surface of the shaft, and the bore $a$ in the sleeve is formed at one side with a longitudinal releasing slot $e$ extending from the outer side of the sleeve into connection with the said recess $d$ which lies adjacent to the inner end of the slot. The inner side of the sleeve at another point upon the bore $a$ is formed with a notch $f$, and a locking-pin $g$ is formed upon the fastener-plug in size suitable to pass readily through the slot $e$, as shown in Fig. 4, and to engage the notch $f$, as shown in Fig. 1, and so located that when thus engaged with the notch, the head of the plug does not project outside the surface of the sleeve. A spring $h$ is inserted in the bottom of the bore $b$ to press the plug normally outwardly, thus preventing any accidental disengagement of the pin when fitted in the notch $f$. When the pin is thus engaged, the plug is held securely in engagement with the bores $a$ and $b$ and wholly prevents any longitudinal or rotary movement of the sleeve upon the shaft. A notch $i$ is formed in the outer end of the plug to insert a screw-driver or turning-tool by which the plug can be forced inwardly to disengage the pin from the notch $f$, and then rotated in the recess $d$ until the pin is in line with the slot $e$, as shown in Figs. 2 and 4. The plug is then free to move outwardly under the pressure of the spring, and can be wholly removed from the two bores which releases the sleeve completely from the shaft, as shown in Fig. 3. The annular recess $d$ is for the purpose of permitting the pin to rotate from its locked position to the slot $e$, and it is obviously immaterial whether such annular recess be formed in the inner side of the sleeve or in the outer side of the shaft, and I have therefore claimed the same as located at the inner end of the slot $e$. It will be observed that with this construction the plug does not project beyond the surface of the sleeve when in its locked position shown in Fig. 1, and cannot project accidentally, as the spring $h$ holds the pin securely in engagement with the notch $f$, which prevents any outward movement of the plug or any rotary movement which might bring the pin in line with the releasing-slot $e$.

The device does not operate by screw or wedge-pressure, like a set-screw or key, but the plug when in its operative position intersects the joint between the shaft and sleeve, and is held in such intersecting position during its locked condition by such means that it cannot move outwardly beyond the surface of the sleeve.

The same characteristic is possessed by the fastener shown in Figs. 6 and 7, in which the bore $b'$ in the shaft $B'$ is made larger than the bore $a'$ in the sleeve $A'$. The plug has a threaded body $c'$ fitted to the bore $b'$, and a cylindrical shank $c^2$ fitted movably to the bore in the sleeve. The notch $i$ in the head of such shank permits it to be rotated, and the bore $b'$ is made of sufficient depth to permit the body $c'$ of the plug to be screwed inwardly by rotating the plug, as shown in Fig. 7, so that the shank $c^2$ is moved inwardly from the sleeve and leaves it free to be removed from the shaft. In this construction, also, it is impossible for the plug to accidentally move outward and cause a projection upon the exterior of the sleeve, collar, or hub, as the threaded portion of the plug is made larger than the bore in the sleeve, and prevents the shank $c^2$ from moving outwardly after the threaded portion strikes the inner side of the sleeve, as shown in Fig. 6, which prevents any further outward movement while permitting a complete engagement of the shank with the bore $a'$.

One characteristic of both the plugs is, that they require an inward longitudinal movement to be disengaged from the sleeve, which inward movement cannot occur accidentally; as with the construction shown in Fig. 1, such movement is prevented by the spring $h$, and with the construction shown in Fig. 6 by the engagement of the thread upon the fastener with the thread in the bore $b'$. To disengage the sleeve from the shaft, it is therefore necessary with either construction to move the plug inwardly, such inward movement in the one case permitting the subsequent withdrawal of the fastener from both of the bores, while the inward movement in the other case permits the withdrawal of the fastener from the sleeve only, leaving it buried in the bore upon the shaft. The construction thus wholly avoids the possibility of accident from the projection of a key or screw upon the body of a shaft or collar.

It will be observed that the plug used in this invention is disposed radially to the shaft so as to intersect the joint of the shaft and collar, and is therefore movable transverse to the said joint when fastening the collar upon or releasing it from the body of the shaft.

The invention is applicable to a shaft, collar, hub, wheel, or any part that is to be fastened detachably upon a shaft or axle, and the terms "sleeve" and "collar" have therefore been used interchangeably herein.

In all cases, the bore is extended wholly through the sleeve so that the outer end of the plug is accessible for rotating or pressing it inwardly, and it will be noticed that the plug performs all its functions without projecting beyond the outer surface of the sleeve where it would be likely to catch in adjacent objects.

Having thus set forth the nature of the invention what is claimed herein is:

1. In a device for securing a sleeve detachably upon a shaft, the combination, with a sleeve and shaft having a movable cylindrical joint with coincident bores in such parts extended across the said joint to the outer side of the sleeve, of a fastener consisting of a plug fitted rotatably in the said bores and movable inwardly therein to clear the sleeve from the shaft, and provided upon its outer end with means accessible at the outer surface of the sleeve for rotating it and moving it inwardly to clear the sleeve from the shaft.

2. In a device for securing a sleeve detachably upon a shaft, the combination, with a sleeve and shaft having a movable cylindrical joint with coincident bores in such parts extended across the said joint to the outer side of the sleeve, said sleeve having a longitudinal slot adjacent its bore and also a locking-notch, and one of said parts having an annular recess at the inner end of said slot, of a plug fitted rotatably in the said bores and movable inwardly therein to clear the sleeve from the shaft, and provided upon its outer end with means accessible at the outer surface of the sleeve, a spring to press it normally outward, and a pin upon the plug adapted to engage the locking-notch and resist outward movement, and also adapted to rotate in the recess and move outwardly from the slot to remove the plug from the sleeve.

In testimony whereof I have hereunto set my hand in the presence of two subscribing witnesses.

CHARLES S. LOCKWOOD.

Witnesses:
 H. G. RANSOM,
 M. E. JAHN.